(12) United States Patent
Hankins et al.

(10) Patent No.: US 10,275,745 B2
(45) Date of Patent: Apr. 30, 2019

(54) WATERFALL PRIORITIZED PAYMENT PROCESSING

(71) Applicant: JPMorgan Chase Bank, N.A., New York, NY (US)

(72) Inventors: Matthew W. Hankins, Chicago, IL (US); William F. Mann, Avondale, PA (US); Mark Dickelman, Inverness, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 873 days.

(21) Appl. No.: 14/086,099

(22) Filed: Nov. 21, 2013

(65) Prior Publication Data

US 2014/0081855 A1 Mar. 20, 2014

Related U.S. Application Data

(63) Continuation of application No. 12/851,743, filed on Aug. 6, 2010, now Pat. No. 8,620,786, which is a
(Continued)

(51) Int. Cl.
*G06Q 20/10* (2012.01)
*G06Q 30/04* (2012.01)
(Continued)

(52) U.S. Cl.
CPC ........... *G06Q 20/102* (2013.01); *G06Q 30/04* (2013.01); *G06Q 30/06* (2013.01); *G06Q 40/00* (2013.01)

(58) Field of Classification Search
CPC .................................................... G06Q 20/04
See application file for complete search history.

(56) References Cited

U.S. PATENT DOCUMENTS 4,205,780 A 6/1980 Burns
4,321,672 A 3/1982 Braun et al.
(Continued)

FOREIGN PATENT DOCUMENTS

EP 0099999 7/1983
EP 421808 4/1991
(Continued)

OTHER PUBLICATIONS

Annual Report Pursuant to Sectin 13 or 15(d) of the Securities Exchange Act of 1934, Form 10-K, Intelidata Technologies Corporation, Fiscal Year Ended Dec. 31, 2001.
(Continued)

*Primary Examiner* — Jessica Lemieux
(74) *Attorney, Agent, or Firm* — Calfee, Halter & Griswold LLP

(57) ABSTRACT

The invention comprises a system and method for "waterfall" type payment processing using multiple alternative payment sources. A payor provides account information for multiple payment sources, such as a bank checking account, savings account, first credit card account, second credit card account, and so forth. The multiple payment sources are prioritized so that one is a primary payment source, another is a secondary payment source, another is a tertiary payment source, and so forth. After setting up the waterfall payment arrangement, when a bill becomes due a payee or third party payment administrator submits transactions against the payment sources in their order of priority until the payment is satisfied. Other variations and enhancements are disclosed.

33 Claims, 5 Drawing Sheets

Related U.S. Application Data continuation of application No. 10/960,012, filed on Oct. 8, 2004, now Pat. No. 7,792,717.

(60) Provisional application No. 60/515,702, filed on Oct. 31, 2003.

(51) Int. Cl.
  *G06Q 30/06* (2012.01)
  *G06Q 40/00* (2012.01)

(56) References Cited

U.S. PATENT DOCUMENTS

| | | | |
|---|---|---|---|
| 4,396,985 A | 8/1983 | Ohara | |
| 4,495,018 A | 1/1985 | Vohrer | |
| 4,617,457 A | 10/1986 | Myers | |
| 4,752,877 A | 6/1988 | Roberts et al. | |
| 4,948,174 A | 8/1990 | Thomson et al. | |
| 4,974,878 A | 12/1990 | Josephson | |
| 5,121,945 A | 6/1992 | Thomson et al. | |
| 5,122,950 A | 6/1992 | Mee | |
| 5,175,682 A | 12/1992 | Higashiyama | |
| 5,220,501 A | 6/1993 | Lawlor | |
| 5,287,269 A | 2/1994 | Dorrough et al. | |
| 5,315,508 A | 5/1994 | Bain et al. | |
| 5,432,506 A | 7/1995 | Chapman | |
| 5,448,471 A | 9/1995 | Deaton et al. | |
| 5,477,040 A | 12/1995 | Lalonde | |
| 5,502,576 A | 3/1996 | Ramsay et al. | |
| 5,506,691 A | 4/1996 | Bednar et al. | |
| 5,532,464 A | 7/1996 | Josephson et al. | |
| 5,544,046 A | 8/1996 | Niwa | |
| 5,570,465 A | 10/1996 | Tsakanikas | |
| 5,572,004 A | 11/1996 | Raimann | |
| 5,583,759 A | 12/1996 | Geer | |
| 5,590,197 A | 12/1996 | Chen | |
| 5,592,377 A | 1/1997 | Lipkin | |
| 5,599,528 A | 2/1997 | Igaki | |
| 5,603,025 A | 2/1997 | Tabb | |
| 5,717,989 A | 2/1998 | Tozzoli et al. | |
| 5,757,917 A | 5/1998 | Rose et al. | |
| 5,774,553 A | 6/1998 | Rosen | |
| 5,784,696 A | 7/1998 | Melnikof | |
| 5,802,499 A | 9/1998 | Sampson et al. | |
| 5,819,238 A | 10/1998 | Fernholz | |
| 5,835,580 A | 11/1998 | Fraser | |
| 5,835,899 A | 11/1998 | Rose et al. | |
| 5,870,723 A | 2/1999 | Pare | |
| 5,870,725 A | 2/1999 | Belinger et al. | |
| 5,898,157 A | 4/1999 | Mangili et al. | |
| 5,987,435 A | 11/1999 | Weiss et al. | |
| 5,987,436 A | 11/1999 | Halbrook | |
| 5,987,439 A | 11/1999 | Gustin et al. | |
| 5,991,750 A | 11/1999 | Craig | |
| 6,000,832 A | 12/1999 | Franklin et al. | |
| 6,009,442 A | 12/1999 | Chen et al. | |
| 6,014,636 A | 1/2000 | Reeder | |
| 6,061,665 A | 5/2000 | Bahreman | |
| 6,088,683 A | 7/2000 | Jalili | |
| 6,088,685 A | 7/2000 | Kiron et al. | |
| 6,088,686 A | 7/2000 | Walker et al. | |
| 6,092,056 A | 7/2000 | Tull, Jr. et al. | |
| 6,098,053 A | 8/2000 | Slater | |
| 6,110,044 A | 8/2000 | Stern | |
| 6,125,354 A | 9/2000 | MacFarlane et al. | |
| 6,128,603 A | 10/2000 | Dent et al. | |
| 6,129,273 A | 10/2000 | Shah | |
| 6,148,293 A | 11/2000 | King | |
| 6,185,544 B1 | 2/2001 | Sakamoto et al. | |
| 6,202,054 B1 | 3/2001 | Lawlor et al. | |
| 6,205,433 B1 | 3/2001 | Boesch et al. | |
| 6,227,447 B1 | 5/2001 | Campisano | |
| 6,233,566 B1 | 5/2001 | Levine et al. | |
| 6,236,972 B1 | 5/2001 | Shkedy | |
| 6,278,981 B1 | 8/2001 | Dembo et al. | |
| 6,304,858 B1 | 10/2001 | Mosier et al. | |
| 6,321,212 B1 | 11/2001 | Lange | |
| 6,338,047 B1 | 1/2002 | Wallman | |
| 6,374,235 B1 | 4/2002 | Chen et al. | |
| 6,393,409 B2 | 5/2002 | Young et al. | |
| 6,405,173 B1 | 6/2002 | Honarvar et al. | |
| 6,415,259 B1 | 7/2002 | Wolfinger et al. | |
| 6,418,419 B1 | 7/2002 | Nieboer et al. | |
| 6,418,420 B1 | 7/2002 | DiGiorgio et al. | |
| 6,418,430 B1 | 7/2002 | DeFazio et al. | |
| 6,578,015 B1 | 6/2003 | Haseltine et al. | |
| 6,609,113 B1* | 8/2003 | O'Leary | G06Q 20/04 705/39 |
| 6,629,081 B1 | 9/2003 | Cornelius et al. | |
| 6,704,714 B1 | 3/2004 | O'Leary et al. | |
| 6,721,715 B2 | 4/2004 | Nemzow | |
| 7,769,998 B2* | 8/2010 | Lynch | G06F 21/33 713/155 |
| 8,930,270 B2* | 1/2015 | Roskind | G06Q 20/02 705/40 |
| 2002/0002546 A1* | 1/2002 | Doerr | G06F 9/4446 706/12 |
| 2002/0012445 A1 | 1/2002 | Perry | |
| 2002/0013728 A1 | 1/2002 | Wilkman | |
| 2002/0023055 A1* | 2/2002 | Antognini | G06K 1/121 705/40 |
| 2002/0026394 A1 | 2/2002 | Savage et al. | |
| 2002/0069134 A1 | 6/2002 | Solomon | |
| 2002/0072974 A1* | 6/2002 | Pugliese, III | G06Q 30/02 705/14.16 |
| 2002/0087468 A1 | 7/2002 | Ganesan et al. | |
| 2002/0107770 A1 | 8/2002 | Meyer et al. | |
| 2002/0111837 A1 | 8/2002 | Aupperle | |
| 2002/0111916 A1* | 8/2002 | Coronna | G06Q 20/00 705/64 |
| 2002/0138398 A1 | 9/2002 | Kalin et al. | |
| 2002/0170966 A1 | 11/2002 | Hannigan et al. | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0046218 A1 | 3/2003 | Albanese et al. | |
| 2003/0097335 A1 | 5/2003 | Muskowitz et al. | |
| 2003/0105641 A1 | 6/2003 | Lewis | |
| 2003/0130948 A1* | 7/2003 | Algiene | G06Q 20/02 705/44 |
| 2003/0225663 A1 | 12/2003 | Horan et al. | |
| 2003/0233305 A1 | 12/2003 | Solomon | |
| 2004/0111370 A1* | 6/2004 | Saylors | G06Q 20/10 705/40 |
| 2005/0033690 A1 | 2/2005 | Antognini et al. | |
| 2006/0116892 A1* | 6/2006 | Grimes | G06Q 10/02 705/5 |
| 2008/0010189 A1* | 1/2008 | Rosenberger | G06Q 20/10 705/39 |
| 2014/0180919 A1* | 6/2014 | Brown | G06Q 20/1085 705/42 |

FOREIGN PATENT DOCUMENTS

| | | |
|---|---|---|
| EP | 1014318 | 6/2000 |
| WO | WO 9745796 | 4/1991 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 9745814 | 12/1997 |
| WO | WO 98/09260 | 3/1998 |
| WO | WO 9910823 | 3/1999 |
| WO | WO 02/063432 | 8/2002 |

OTHER PUBLICATIONS

CESNaBANCO introduces stored value card technology blockbuster video is first merchant partner.

(56) References Cited

OTHER PUBLICATIONS

Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.
Carreker, Electronic check presentment: Capturing new technology, http://proquest.umi.com, Banking Management, Rolling Meadows: vol. 71, Issue 2, Mar./Apr. 1995, p. 32, 5 pages.
First Data markets stored-value cards, Cards International, Jan. 30, 1996, p. 5.
Money, Initial Launch to 200 Credit Unions, USA Today.com, Jun. 27, 2002.
Decovny, Net Scopt, Banking Technology, May 1997.
Nokia Announces the World's First NFC Enabled Mobile Product for Contactless Payment and Ticketing, PRNewswire, Feb. 9, 2005.
Anonymous, Operating in a multi-currency environment, ProQuest document ID 9215937, ISSN/ISBN 09589309, Oct. 1995.
Payment data, www.paymentdata.com, Mar. 5, 2004.
Maher and Troutman, Payor's Prescription for Painless Migration to Electronic Healthcare Payments and Remittance Advices, PNC Bank, Dec. 2001.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Visa & Carnegie Mellon Plan Online Payment Scheme, Newsbyte News Network, Feb. 15, 1995, 2 pages.
Priya, Malhotra, "Clearing House Enumerates e-Payments Ills," American Banker The Financial Services Daily, Tuesday, Aug. 13, 2002, 2 pages.
Financial News, "Wells Fargo Rolls Out Nationwide Lockbox Check Conversion," PR Newswire Association, Apr. 22, 2003, 2 pages.
Cards International, Jan. 30, 1996, First Data markets stored-value cards, 2 pages.
Business Wire, Jan. 15, 1996, CES/NaBANCO introduces stored value card technology; blockbuster video is first merchant partner, 2 pages.
Melinda Norris, et al., Omaha World Herald, Jan. 19, 1996, Sunrise Edition, First data unit develops blockbuster cash card, 2 pages.
Valerie Block, The American Banker, Sep. 1, 1995, Blockbuster running test of a stored value card, 2 pages.
Wall Street Journal, Nov. 7, 2002, Fidelity Helps Fund Sellers Trim the Taxes They'll Owe, 2 pages.
Harsh Truth: Your Investments Likely Won't Make Any Money, 2 pages, (Author & Date Unknown).
Huddling With William Bernstein: Small Town Doctor, Investing Pro, 3 pages, (Author & Date Unknown).
Erica Goode, The New York Times, Nov. 5, 2002, On Profit, Loss and the Mysteries of the Mind, 4 pages.
Angela Maher et al., PNCBANK, Today's Issues in Treasury Management, Payor's Prescription for Painless Migration to Electronic Healthcare Payments and Remittance Advices, www.treasury.pncbank.com, 6 pages.
Angela Maher et al., PNCBANK, Today's Issues in Treasury Management, Provider's Prescription for Painless Migration to Receipt of Electronic Healthcare Payments and Remittance Advices, www.treasury.pncbank.com, 8 pages.
Gregory Zuckerman, The Wall Street Journal Online, Jun. 12, 2002, The Hedge-Fund Craze, 17 pages.
Ian McDonald, The Stars in the Sky Flicker, And Fund Stars Do the Same, 3 pages.
Card Flash Daily Payment Card News, Sep. 23, 2004, CardWeb.com Inc., 3 pages.
Yahoo Direct printout dated Apr. 2003, 19 pages.

* cited by examiner

WATERFALL PRIORITIZED PAYMENT PROCESSING

CROSS-REFERENCE TO RELATED APPLICATIONS

This patent application is a continuation application of U.S. patent application Ser. No. 12/851,743, filed Aug. 6, 2010, which is a continuation of U.S. patent application Ser. No. 10/960,012 filed Oct. 8, 2004, which claims the benefit of and incorporates by reference the subject matter of U.S. Provisional Application No. 60/515,702, filed Oct. 21, 2003, all of which are hereby incorporated in their entirety.

FIELD OF THE INVENTION

The present invention relates generally to payment processing, and more particularly, to a payment processing system and method providing for prioritized waterfall-type payment processing of payments by a biller or payment administrator.

BACKGROUND OF THE INVENTION

It is known in the prior art to provide payment information to a biller so that recurring payments can be billed with minimal or no effort required by the consumer. For example, many individuals set up automatic payment for their Internet service, their pay Web sites, and the like, by providing their credit card information to the biller. The biller is then authorized to submit transactions against that credit account for each new bill that comes due. Other prior art autopayment systems allow for the consumer to provide checking account information so that their house payment or car payment can be billed against their checking account each month. In some instances, direct deposit accounts (DDAs) like checking accounts used for autopayment may also have overdraft protection to ensure the account is not overdrawn.

Such autopayment solutions have cut expenses for billers and reduced the amount of time consumers spend doing their bills each month. However, such solutions still have a number of drawbacks. One drawback of typical autopayment systems is that if the account provided by the consumer is overdrawn or over a limit, funds will not be available to satisfy the payment due. As a result, the biller will suffer increased costs in writing, calling, or otherwise contacting the consumer in attempting to secure payment. Also, in such a scenario the biller moves from a substantially automated payment collection approach to a non-automated payment approach. The consumer suffers because, as a result of nonpayment, he/she has a deteriorated relationship with the biller that may result in loss of service, reports to a credit agency, and so forth. The consumer may also suffer direct charges against the payment account as a penalty for attempting to overdraw the account or exceeding a credit limit. These are significant problems in the prior art that impose costs and inconvenience on billers and consumers.

Another drawback of typical autopayment solutions is that they offer limited or no flexibility to the consumers. Because they are typically offered with fixed terms and with a fixed structure, they are not adapted to meet each consumer's particular needs. This is a significant disadvantage to consumers, who will either select a product that is not ideal for their needs or decide to forego the autopayment product entirely. These disadvantages flow to the payees/payment administrators as well.

Other problems and drawbacks also exist.

SUMMARY OF THE INVENTION

An embodiment of the present invention comprises a method for prioritized processing of multiple payment accounts for recurring payments due. According to the invention, a plurality of prioritized payment sources (e.g., a checking account, savings account, credit account, debit account, stored value account, etc.) are identified as available options for satisfying recurring bills. When a payment is due, a biller or billing agent submits transactions against the payment accounts in their order of priority so that the balance is satisfied. If the bill is satisfied by a transaction against a primary payment source, the bill is satisfied and no further transaction is required. If the bill cannot be satisfied by the primary payment source, a transaction is submitted against a secondary payment source and, if necessary, further available payment sources, until the bill is satisfied.

According to one aspect of the invention, the payor provides the account information for the various payment sources, but the biller (or billing agent) assigns or predesignates the order of priority of the payment sources.

According to another aspect of the invention, the payor can provide the account information as well as the order of priority of the payment sources. Thus, a first consumer may decide to have his/her checking account as the primary source, followed by a credit account, whereas a second consumer may select the reverse approach (credit, then checking).

According to another aspect of the invention, the system and method can be configured for distributed charges across prioritized payment sources. In this embodiment, the entirety of the bill need not be satisfied from a single payment source; instead, portions of the bill can be spread across payment sources in their order of priority (e.g., 75% on checking, followed by 25% on the credit account).

According to yet another aspect of the invention, the payor may be permitted to establish payor payment rules. According to one approach, such payor payment rules may permit the payee to do more than identify the account numbers and establish the order of priority. For example, payment rules may include setting lock-out dates (e.g., do not submit charges against the checking account the day the mortgage payment is due), minimum balance dates (e.g., do not submit a charge against the checking account on the day the mortgage payment is due if the charge would deplete funds needed for the mortgage); repeat transaction rules (e.g., submit transactions against the first payment source at least twice before transitioning to the second payment source), and the like.

According to a further enhancement to the invention, the system and method provide for intelligent waterfall payment processing wherein balances and/or limits are checked or queried prior to submitting a transaction against an account. For example, if a pre-transaction check reveals that insufficient funds are available to satisfy an amount due, a transaction need not be submitted against that account.

According to a further enhancement of the invention, the system and method provide for waterfall payment processing including recommendations provided by a recommendation module regarding which next-level payment sources should be used when a primary payment source is unable to satisfy a payment due. Such a recommendation may include not only information regarding which next-level payment source should be used, but also information on how or to what extent a next-level payment source should be used.

Accordingly, it is one object of the present invention to overcome one or more of the aforementioned and other limitations of existing systems and methods for autopayment bill processing.

It object of the invention to provide a bill payment processing system and method with multiple layers that protect the biller and consumer from unsatisfied bills resulting in delayed payment, additional fees/penalties, and/or negative credit information.

It is another object of the invention to provide a multi-layered bill payment processing system and method where the consumer can select the accounts and priority of the accounts for waterfall-type payment processing.

It is another object of the invention to provide a multi-layered bill payment processing system and method wherein payments due can be spread or distributed across multiple payment sources in automated fashion.

It is another object of the invention to provide a multi-layered bill payment processing system and method wherein the consumer is empowered to establish payor payment rules governing the transactions submitted against the multiple payment sources.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

As used herein, the terms "multi-layered" and "waterfall" type processing broadly refer to the use of multiple (at least two) payment sources which are prioritized regarding the order in which they are used (or attempted to be used or considered for use) for satisfying payments due. A "payor" refers to a party paying a bill, and may include consumer payors and commercial payors, including agents of either. A "payee" refers to the intended recipient or beneficiary of a payment, including the payee's agents. The party submitting the transactions against the prioritized payment sources may be the payee itself, a third party payment administrator (e.g., a bill presenter providing a bill presentment service), or the agents of either. "Automatic payment" processing refers to the payment of bills due on behalf of a payor where the transactions submitted against a payment source are submitted by somebody other than the payor, e.g., the payee or a payment administrator, who already possesses the appropriate payment source account information. Automatic payment might not require any payor input or approval for each payment due, or in some cases may require payor input or approval (e.g., approval to proceed provided in response to a bill presented to the payor). While the invention finds beneficial application for recurring payments, it should be understood that the invention is readily applicable to one-time type payments, such as where a consumer provides multiple payment source information to an airlines when ordering tickets, just to provide a single example.

Figure 1:
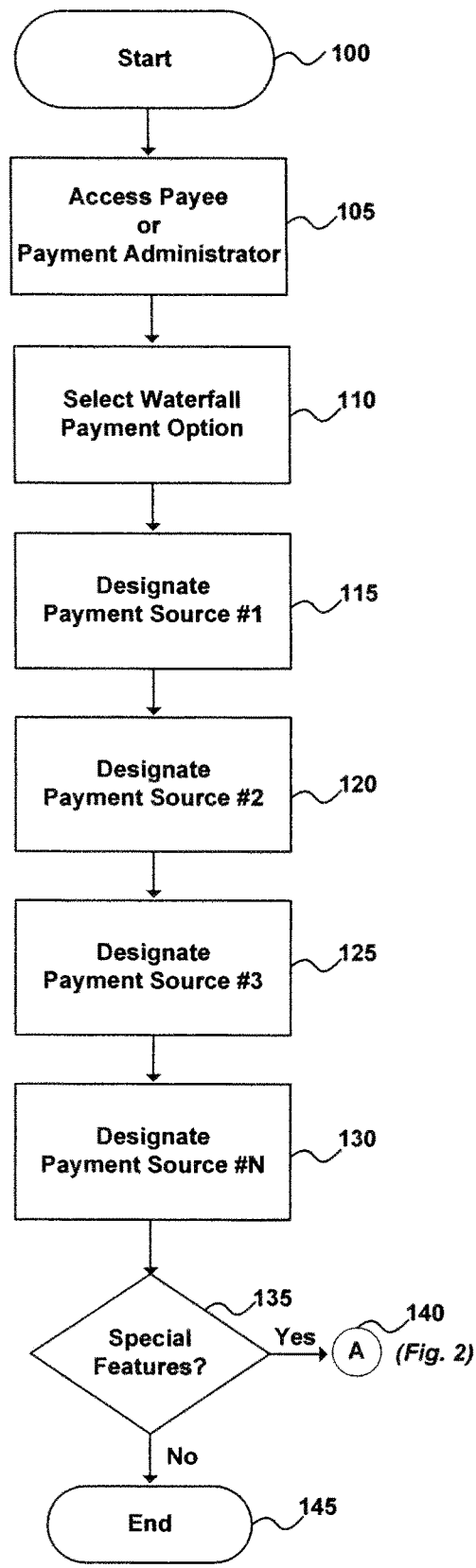
FIG. 1 is a flow diagram of a method for establishing a prioritized plurality of payment source options for bill payment processing according to an embodiment of the invention.

FIG. 1 is a flow diagram of a method for establishing a prioritized plurality of payment source options for bill payment processing according to an embodiment of the invention. The method starts at 100, and at 105 the payee or a payment administrator is accessed or contacted by the payee. The payor may access the payee/payment administrator over a shared network such as the Internet (also, any LAN, WAN, MAN, or other shared computer network) using a personal computer, Palm device, personal data assistant (PDA), wireless device, or similar device. The payor may access the payee/payment administrator over a phone network by making a call using a conventional telephone, car phone, cell phone, PCS (personal communication system), or the like. For phone-based access, the payor may provide information to the payee/payment administrator by speaking with a live or virtual agent, interacting with a virtual response unit (VRU)/interactive voice response (IVR) unit, or via other suitable means for providing information.

According to a preferred approach, at 105 the payor accesses the payee/payment administrator by accessing a Web site on the Internet or like shared network using a personal computing device.

At 110, the payor may select a waterfall payment option for bill payment processing. This may be accomplished by inputting a selection on a Web page, speaking to an agent, inputting keypad entries to be processed by a VRU/IVR, or the like. According to a preferred approach, the payer accesses a Web page for selecting the waterfall payment option using a secure link over the Internet.

At 115, the payor designates a first payment source, Payment Source #1 (PS #1). Just as one example, PS #1 may be the identity (e.g., account number) of a checking account supplied by the payor. The type of payment source (e.g., checking account v. savings account v. credit card account v. stored value account v. home equity line of credit, margin account, etc.) may be imposed by the payee/payment administrator, with the payor only supplying the specific account identity for the predetermined account type. Thus, the payee/payment administrator may require that the first priority payment source be a checking account, or a savings account, or a credit card account, or other type of account.

In another embodiment, the payor is permitted to select the payment source type. In this embodiment, the payor can determine, just by way of example, that his/her first priority payment source will be a credit card type account, and that it will specifically be his/her Chase® VISA® credit card 1234 5678 1234 5678, rather than his/her Chase® debit card 5678 1234 5678 1234. According to a preferred approach, the payer may be provided a series of options in step 115 for selecting the payment source type (e.g., radio buttons on a Web page), along with blocks for entering account numbers and other account identification information.

In step 120, the payor designates a second payment source, Payment Source #2 (PS #2). PS #2 can be designated by the payor as described above by providing account identification information for a second-level payment source type predetermined by the payee/payment administrator. Alternatively, the payment source type for the second-level source can be selected by the payor.

According to one embodiment of the invention, PS #1 designated in step 115 is a checking account and PS#2 designated in step 120 is a credit card account so that the payor's checking account is effectively protected from overdrafts by the payor's credit card account. In this embodiment, the payee/payment administrator for autopayment could be the payor's bank.

In step 125, the payor designates a third payment source, Payment Source #3 (PS #3). PS #3 can be provided by the payor as described above by providing account identification information for a payment source type predetermined by the payee/payment administrator or selected by the payor.

In step 130, the payor designates an Nth payment source, Payment Source #N (PS #N). PS #N can be provided by the payor as described above by providing account identification information for a payment source type predetermined by the payee/payment administrator or selected by the payor.

According to the invention, the number of payment sources N identified by the payor is at least two, preferably three, although four, five, or even more payment sources can be used in accordance with the invention.

In step 135, the method may optionally permit the payee/payment administrator to make available, and the payor to select, certain special features for the waterfall payment processing. If the payor does not wish to enroll in, enable, or establish such special features, the method ends at 145. If the payor is interested in such special features, the method proceeds from 140 to FIG. 2.

Figure 2:
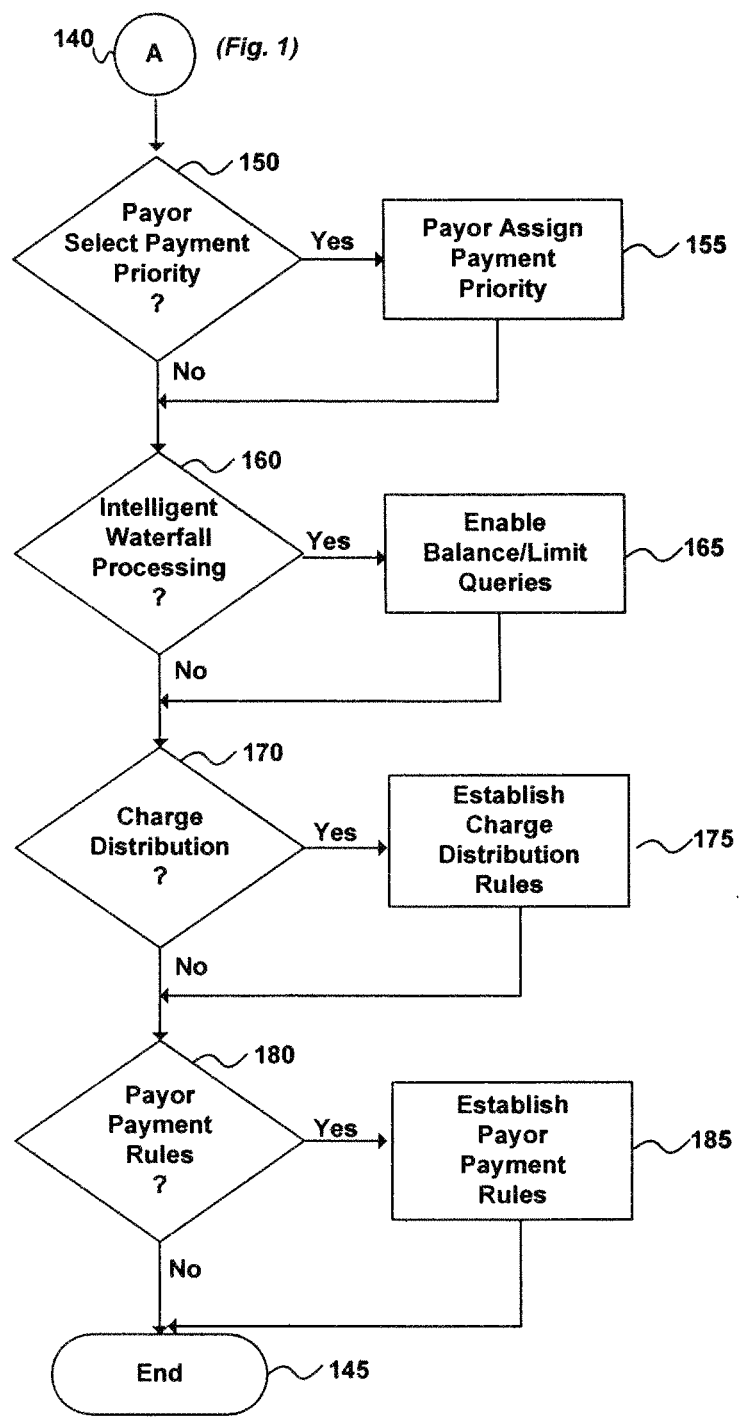
FIG. 2 is a flow diagram of a method for establishing a prioritized plurality of payment source options for bill payment processing according to another embodiment of the invention.

FIG. 2 is a flow diagram of a method for establishing a prioritized plurality of payment source options for bill payment processing according to another embodiment of the invention. Beginning at 140, various special features for the waterfall payment processing are made available.

At 150, the payor can select or establish payment priority for the multiple N payment sources. For example, the payor may have inputted or entered account information for (1) a checking account, (2) savings account, (3) first credit card account, (4) second credit card account, and (5) stored value account. At step 150, the payor may be enabled to establish (or revise, if the priority was already established by the order in which the accounts were entered) that the priority for waterfall payment processing should be 5/4/3/2/1, 4/3/5/1/2, or other sequence preferred by that consumer. According to a further embodiment, the payor may be permitted to order the priority of some, but not all, of the multiple payment source options. For example, the payee/payment administrator may require that the first priority payment source be a checking account, but will allow the payor to order the priority of the next-level payment sources (e.g., payment sources 2-3). Other variations through which the system may permit a payor to prioritize some but not all of the payment sources are well within the spirit and scope of the present invention.

Therefore, if the payor wishes to establish or revise payment priority ("Yes" at 150), the payor assigns payment priority at 155. The assignment of payment priority may be accomplished by any of the means previously described. Preferably, the assignment is made by the payor making entries on a Web page, such as by clicking radio buttons or making entries into blocks on the page.

The method resumes at 160, where so-called "intelligent" waterfall processing may be enabled. Intelligent waterfall processing may include further features designed to reduce risk or costs to the payor and/or payee/payment administrator One intelligent waterfall processing feature is to provide for balance and/or limit checks to be performed before submitting transactions against certain or all payment sources. For example, before submitting an ACH transaction to transfer funds from a savings or checking account, the payment processing system may first check the balance of such an account in order to avoid a rejected transaction request (and bounced check fees, and/or other penalties and delays, etc.). In the case of a credit card transaction, the payment processing system may check both the balance and a credit limit (or simply a credit available value, if available) before submitting the credit transaction request. Such balance and/or limit checks may be performed for all accounts for the multiple payment sources designated by the payor, or only for selected accounts.

Therefore, if the payee/payment administrator wishes to provide, and if the payor wishes to enable, such intelligent payment features ("Yes" at 160), the payor enables balance/limit queries for (selected or all) payment sources at 165.

At 170, the waterfall payment processing method may provide for charge distribution across multiple payment sources. According to this enhancement, rather than requiring that a single payment source be capable of absorbing the entirety of a charge, the invention allows for spreading the payment across multiple payment sources, preferably in their order of priority. For example, 75% of a charge may be made against the first payment source (e.g., checking account) and the remaining 25% of the charge may be made against a second payment source (e.g., credit card account).

Therefore, if the payee/payment administrator wishes to make available, and if the payor wishes to enable, such charge distribution ("Yes" at 170), charge distribution rules are established at 175. Such charge distribution rules may be (1) imposed by the payee/billing administrator based on fixed, predetermined rules, (2) selected by the payor from several alternative sets of distribution rules made available by the payee/payment administrator, or (3) established entirely by the payor. An nonexhaustive list of examples of charge distribution rules include: maximum charge submitted at each level until payment due is satisfied (e.g., for a $100 charge, $67 charged against checking account with $67 balance, with remaining $33 charged against next-priority credit account); percentage basis (e.g., for the $100 charge, $67 is charged against checking account, and remaining portion of $33 is allocated to next-level accounts on percentage basis, such as pro rata [50% of remainder on credit account and 50% of remainder on stored value account], or otherwise [75% of remainder on credit account and 25% of remainder on stored value account]). The charge distribution rules may also include charge distribution minimum thresholds (e.g., in order to prevent an inefficient 25 cent charge against a credit card account that does not have available credit to absorb a larger charge.) Other charge distributions rules are within the spirit and scope of the invention.

At 180, certain payor payment rules may be established. Payor payment rules refer to rules which may go beyond merely establishing the identity of the specific payment source accounts and their priority. Payor payment rules may include such things as allowing the payor to establish lock-out dates (i.e., dates on which or windows during which charges should not be submitted against all or selected payment source accounts). Lock-out dates may be established in order to avoid transactions being submitted against an account on the date that a mortgage payment, rent payment, car payment, or the like is scheduled to be deducted from an account.

Payor payment rules may also take the form of a variation of lock-out dates, which can be referred to as "minimum balance dates." Unlike a lock-out date, which prevents any waterfall transaction removing funds on the given date (or window of time), a minimum balance date refers to a date (or windows of time) on which transactions can be submitted to remove funds only if a minimum balance is preserved. For example, if a monthly mortgage payment of $1500 is due each month on the $15^{th}$, a minimum balance date setting can be establish to ensure that any waterfall payment transaction submitted does not deplete the account of funds needed for the mortgage on that day. Typically, a minimum payment date will include or be associated with a balance that should not be depleted on the date.

Payor payment rules may also include repeat transaction rules (e.g., submit transactions against the first payment source at least twice before transitioning to the second payment source).

Payor payment rules may also include lock-in dates providing that transactions should be submitted against all or selected payment source accounts on certain dates, such as on fixed dates ($15^{th}$ of each month), or relative dates (15 days before the bill is due).

Accordingly, if payor payment rules are to be established ("Yes" at 180), then at 185 the payor payment rules are selected.

The method ends at 145.

Figure 3:
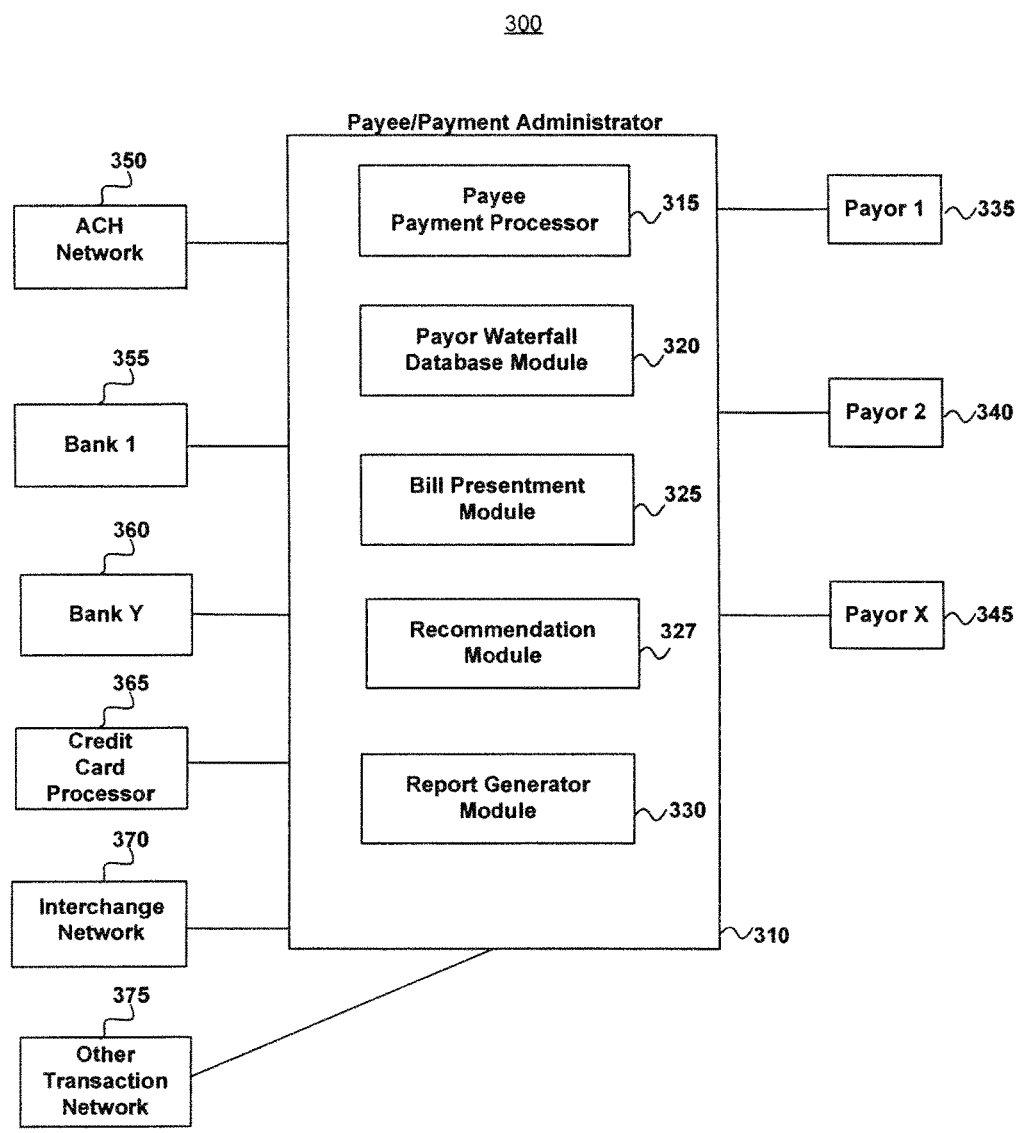
FIG. 3 is an exemplary system for implementing a prioritized waterfall-type bill payment processing system according to an embodiment of the invention.

FIG. 3 is an exemplary prioritized waterfall-type bill processing system 300 according to an embodiment of the invention. Waterfall bill processing system 300 includes a plurality of payors (payor 1, payor 2, and payor X) at 335, 340, and 345; payee/payment administrator system 310; and payment source gateways and repositories 350-375.

It should be readily appreciated that the invention can be implemented for a single payee by interfacing with a single payee system 310; for multiple payees by separately interfacing with distinct payee systems 310; or for single or multiple payees by interfacing with a single payment administrator 310.

Payors 335-345 are payors participating in the waterfall bill processing of the present invention. Payors 335-335 may interface with system 300 through computer devices over a computer network (as previously described), telephones over a telephone network (previously described); or any other suitable mechanism for communicating with system 310.

Payee/Payment administrator system 310 is a system for enabling payors to set their prioritized payment sources, and for submitting transactions against those payment sources for bills that become due. Payee/Payment administrator system 310 may include one or more server devices, workstations, mainframes, and databases, including appropriate software, for carrying out the aforementioned. The aforementioned components may be collocated in one location or, alternatively, may be distributed (through networked or non-networked connections) across multiple geographic locations.

Payee/Payment administrator system 310 may be further divided into functional modules, such as payee payment processor 315, payor waterfall database module 320, bill presentment module 325, recommendation module 327, and report generator module 330.

Payee payment processor 315 comprises a processor for preparing and submitting transactions to satisfy amounts due to a payee. Payee payment processor 315 may be operated by the payee itself or a third party billing administrator. Payee payment processor 315 submits such transactions against payment source accounts in accordance with the payment waterfall data stored in payor waterfall database module 320.

Payor waterfall database module 320 stores the prioritized multiple payment source data provided by the payors. Payor waterfall database module 320 may include or be coupled to (not shown) a processor or server for providing options to a payor for inputting payment source accounts, priority order settings, and other settings as previously described. Payor waterfall database module 320 may also store other waterfall payment settings, such as intelligent waterfall processing options, charge distribution options, and payor payment rules, as previously discussed.

The person of ordinary skill in the art will readily appreciate that payor waterfall database module 320 can comprise a single integrated database, a relational database, multiple databases, or other variation as appropriate to carry out the invention.

Bill presentment module 325 performs a bill presentment function. According to one embodiment, bills reflecting payments due are presented to the payor, although approval for each bill is not required for waterfall payment processing to proceed. According to another embodiment, approval for the initiation of waterfall payment processing is required, although separate approval at each stage in the waterfall is not required. According to yet another embodiment, separate approval at each stage in the waterfall is required. According to yet another embodiment, separate approval for only specified stages is required. For example, a payor may select options such that bills due are automatically paid according to his/her waterfall payment settings, unless and until a home equity line of credit account or a margin account is to be accessed, in which case a specific approval is required. Other variations to approval requirements are within the spirit and scope of the present invention.

Report generator module 330 generates various reports. For example, module 330 may generate post-transaction reports to communicate to payors which of the various payment source accounts have been accessed during a given month or other period.

Payment source gateways and repositories 350-375 reflect the various gateways to payment sources and actual repositories for payment sources accessed for the waterfall payment processing of the present invention. These are exemplary only, and other gateways/repositories could easily be used without departing from the spirit and scope of the present invention.

According to FIG. 3, an ACH network 350 may be accessed to submit ACH transactions against a payor's checking account or savings account. In some instances, the payee/payment administrator 310 may have direct access to account repositories such as bank 1 355 and bank Y 360. Typically, for credit card transactions payee/payment administrator 310 will submit transactions through a credit card processor 365 service, as well understood in the art. In some instances, payee/payment administrator 310 may have a direct connection into an interchange network 370 (e.g., VISA® network or MasterCard® network). Payee/payment administrator 310 may submit transactions to other transaction networks 375, such as local electronic funds transfer (EFT) networks, ATM networks, stored value networks, private networks, and so forth. Other transaction networks 375 may be employed as appropriate, for example, a stored value processing network.

The system of FIG. 3 may include a further enhancement comprising a recommendation module 327. Recommendation module 327 provides various options to the payor in conjunction with the use of the prioritized multiple payment source accounts. In particular, when a bill payment is due, recommendation module 327 provides recommendations to the payor regarding which of the multiple payment source accounts should be used and/or to what extent they should be used to satisfy a bill payment which is due. For example, recommendation module 327 may provide recommendations that impose the least cost or are otherwise more advantageous to the payor.

By way of example, recommendation module 327 may find beneficial application in the context of a payment due for a credit card statement. A payor has set up multiple payment source options in accordance with the invention. The payment due involves a recurring payment for a credit card statement that comes due monthly. According to the invention, a payor may have established a checking account (DDA) as the primary payment source account, a savings account as a secondary payment source account, and a home equity loan account (HELA) as a tertiary payment source account. Accordingly, when the credit payment (e.g., $1000 balance, with a $40 minimum payment) is due, payee/payment administrator 310 may first attempt to use the checking account to satisfy the payment due ($1000). If the primary source is unable to satisfy the bill, payee/payment administrator 310 may then attempt to use the savings account to satisfy the bill. If the savings account fails or is otherwise unable to satisfy the bill, recommendation module 327 of payee/payment administrator 310 may recommend the next preferred option.

For example, recommendation module 327 may recommend as the next preferred option one of several possible alternatives, such as (1) use the checking account to pay the minimum payment due ($40), (2) use the savings account to pay the minimum payment due, (3) pay the entire balance ($1000) using the tertiary HELA account, (4) pay only the minimum payment due using the HELA account, (5) combinations of the above (e.g., pay the minimum balance of $40 from checking/savings and the remaining $960 from the HELA account), etc.

Recommendation module 327 preferably makes such recommendations according to their minimum cost to the payor. For example, if accessing the tertiary HELA account imposes interest costs less than the interests costs for revolving credit on the credit card (for which the bill is due), recommendation module 327 may recommend that the HELA account be used as necessary to eliminate the credit card balance. On the other hand, if the HELA account has a higher interest rate than the credit card, recommendation module 327 may recommend only that the minimum balance be paid and that the remainder be allowed to revolve in to the next month.

Other variations regarding how recommendation module 327 provides preferred options to the payor are well within the scope and spirit of the present invention. Preferably, recommendation module 327 provides these options as recommendations which the payor can accept (approve) or decline (reject).

Preferably, recommendations module 327 is configured to provide recommendations to the payor based on an overall parameter of least expected (predicted) cost for the payor for that payor's payment sources/priorities as maintained in the database module 320. As such, the database module 320 may include not only the payor's accounts and priorities, but also salient terms for those accounts, such as applicable interest rates.

Figure 4:
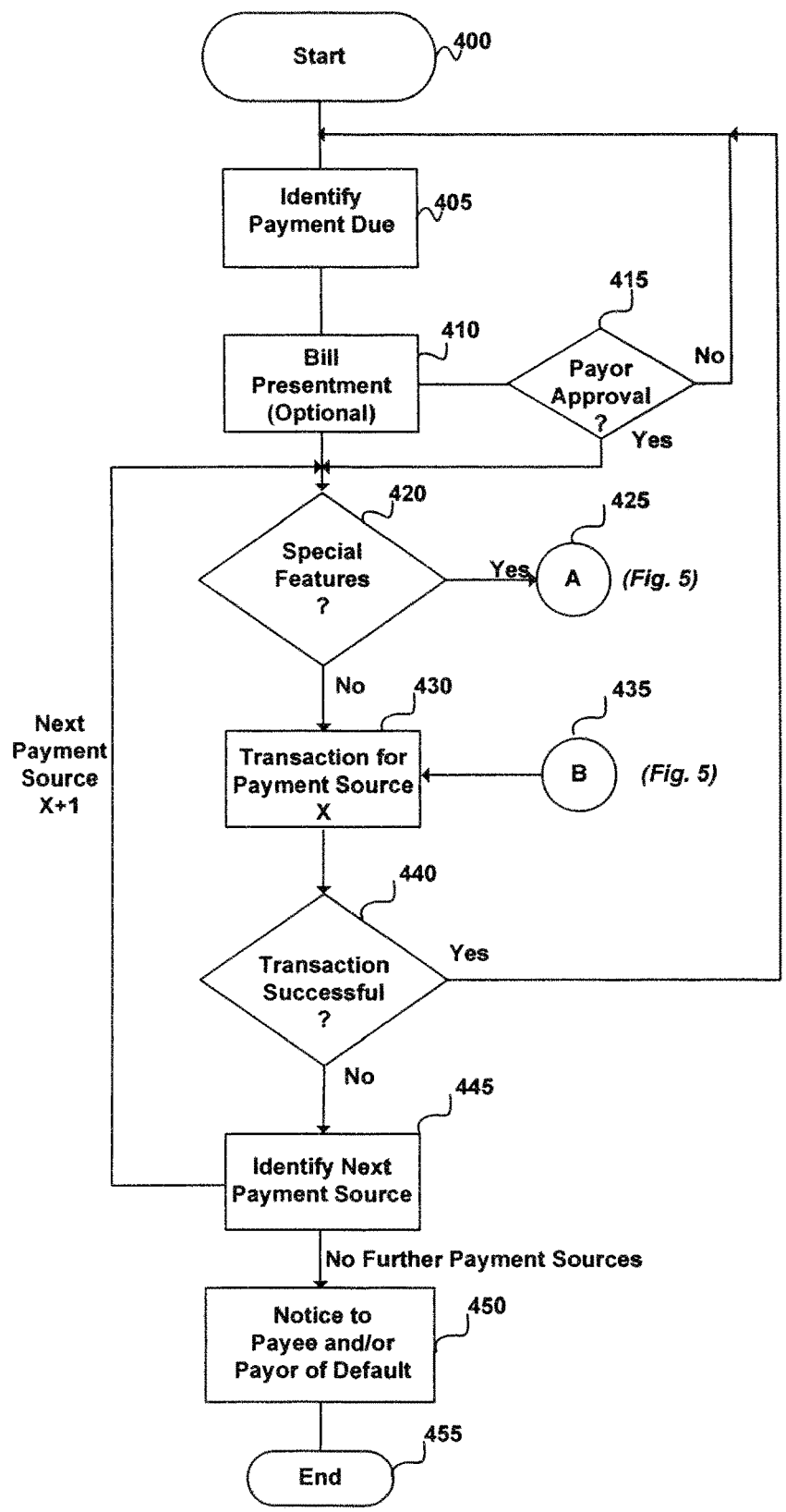
FIG. 4 is a flow diagram of a method for processing transactions for bill payment according to waterfall-type bill processing criteria according to an embodiment of the invention.

FIG. 4 is a flow diagram of a method for processing transactions for bill payment according to waterfall-type bill processing criteria according to an embodiment of the invention. The method starts at 400, and at 405 a payment due is identified. At 410, optional bill presentment is provided to the payor. As described previously, the payor may or may not be required to specifically approve payment of a bill presented. If approval is required, and if approval is denied ("No" at 415), then the method returns to 405. If approval is required, and if approval is granted ("Yes" at 415), the method proceeds to 420.

Figure 5:
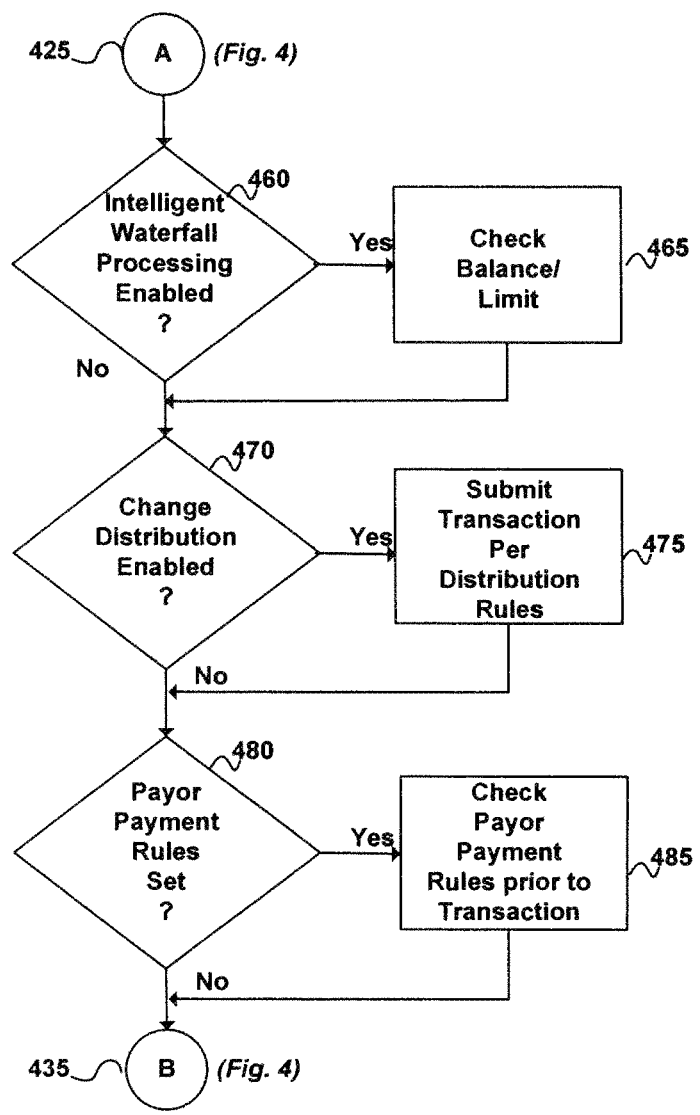
FIG. 5 is a flow diagram of a method for processing transactions for bill payment according to waterfall-type bill processing criteria according to another embodiment of the invention.

At 420, if certain special features are available ("Yes" at 420), the method proceeds to 425. Referring now to FIG. 5, at 460 if intelligent waterfall processing is enabled ("Yes" at 460) then a balance(s) and/or credit limit(s) may be checked at 465. The method returns to step 470. Based on those checks, transactions for specific payment sources may or may not be submitted at step 430 depending on whether sufficient funds are available based on the check results.

If intelligent waterfall processing is not enabled ("No" at 460), the method proceeds to step 470.

At 470, if charge distribution is enabled ("Yes" at 470), then a transaction may be submitted in accordance with the charge distribution rules at 475. The method returns to step 480.

If charge distribution is not enabled ("No" at 470), the method proceeds to step 480.

If payor payment rules are established ("Yes" at 480), then payor payment rules are observed in accordance with submitting transactions at 485. The method returns to 435, payor payment rules are not established ("No" at 480), the method proceeds to 435.

At 435 on FIG. 5, the method returns to 430 on FIG. 4.

If no special features are enabled at 420 ("No" at 420) on FIG. 4, the method proceeds to 430 on FIG. 4.

At 430, a transaction for a given payment source X out of the N payment source options is submitted. If the transaction is successful ("Yes" at 440), the method returns to 405 to address the next payment due. If the transaction is not successful ("No" at 440), the next payment source X+1 is identified at 445 (e.g., using the payor's payment waterfall data stored in database 320 of FIG. 3), and the method returns to 420 so that a transaction can be attempted for the next-level payment source.

The method can cycle through all N payment sources for a given payor. If transaction requests continue to be rejected or otherwise fail, then at 450 notice may be given to the payee and/or payor of the default.

The method ends at 455.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A computer-implemented method of prioritized processing of payments for recurring bills, the payments from a payor to a payee, the method comprising:

storing, in at least one non-transitory computer memory, executable instructions for a server device or client computer and a plurality of payment source options, the payment source options being stored in a payor waterfall database and including multiple source accounts for payments of recurring bills;

accessing, using at least one computer processor, the at least one non-transitory computer memory and executing the instructions to perform multiple steps including:

facilitating creation of priority rules for prioritizing the payment source options for payment from the payor, wherein each of said multiple source accounts is selectable as a primary payment source having a first priority and a secondary payment source having a second priority to be usable for future payments from the payor and storing the priority rules in the at least one non-transitory computer memory;

communicating with the payor over a computer or telephone network to establish charge distribution rules for distributing a single payment across at least two of the prioritized plurality of payment source options according to the priority rules, wherein at least one of the charge distribution rules requires distributing the single payment across multiple payment source options even when the primary payment source has sufficient funds to satisfy a payment due;

identifying a payment due for a recurring bill from the payor;

submitting a transaction request for the single payment due against the prioritized plurality of payment sources; and processing the transaction against the prioritized plurality of payment sources in the order of their priority, as set forth by the priority rules and the charge distribution rules stored in the payor waterfall and accessible to the at least one computer processor, until one of said payment source options satisfies the single payment due, wherein the transition from one payment source to another is automatically executed by the at least one computer processor in accordance with the priority rules and charge distribution rules, thereby providing a waterfall payment process enabling a payment due from the payor for the recurring bills to be satisfied for the payee using a plurality of prioritized payment sources.

2. The method of claim 1, wherein the communication is accomplished by the payor using a mobile device over the network.

3. The method of claim 1, further comprising allowing the payor to establish payor payment rules.

4. The method of claim 3, wherein the payor payment rules include lock-in dates, the lock-in dates providing that payments should be submitted against a selected payment source on a predetermined date.

5. The method of claim 1, further comprising providing the payor with recommendations for using the multiple payment source accounts to minimize cost to the payor.

6. The method of claim 5, further comprising providing the payor with a recommendation of an amount of a credit card balance to pay to minimize cost to the payor.

7. The method of claim 1, wherein the plurality of payment source options is three, including the primary payment source, the secondary payment source, and a tertiary payment source.

8. The method of claim 1, wherein the plurality of payment source options is greater than three.

9. The method of claim 1, wherein the payor provides specific account information for each of the plurality of payment source options, and wherein the priority of said payment source options is set by the payee or by a payment administrator.

10. The method of claim 1, wherein the payor provides specific account information for each of the plurality of payment source options, and the payor selects the priority of said payment source options, thereby enabling the payor to set both the accounts to be used and the priority of usage of the accounts.

11. The method of claim 1, wherein submitting a transaction against the prioritized plurality of payment sources in the order of their priority includes submitting a first transaction for a portion of the balance due against a first payment source, and submitting a second transaction for a remaining portion of the balance due against a second payment source, thereby enabling distribution of the charge for the payment due across multiple payment sources in their order of priority.

12. The method of claim 3, wherein the payor payment rules provide (a) a lock-out date or window on which no transaction can be submitted against the at least one specified payment source, or (b) a minimum payment date or window on which a transaction exceeding a calculated amount that depletes funds in the at least one specified payment source beyond a predetermined balance is not to be submitted against the at least one specified payment.

13. The method of claim 3, wherein the payor payment rules provide that payment from at least one specified payment source should be attempted more than once before transitioning to the next priority payment source.

14. The method of claim 1, further comprising conducting at least one of a balance check and a limit check for a specified payment source prior to submitting a transaction for a transaction amount against the specific payment source, thereby enabling the avoidance of submitting transactions against payment sources unable to satisfy the transaction amount.

15. The method of claim 1, wherein identifying a payment due for the payee further comprises presenting information of the payment due to the payor prior to submitting a transaction.

16. The method of claim 15, further comprising receiving an approval from the payor prior to submitting a transaction.

17. A computerized system for prioritized processing of payments for recurring bills, the payments from a payor to a payee, the system comprising:

at least one non-transitory computer memory storing executable instructions for a server device or client computer and a plurality of payment source options, the payment source options being stored in a payor waterfall database and including multiple source accounts for payments of recurring bills;

at least one computer processor accessing the at least one non-transitory computer memory and executing the instructions to perform multiple steps including:

facilitating creation of priority rules for prioritizing the payment source options for payment from the payor, wherein each of said multiple source accounts is selectable as a primary payment source having a first priority and a secondary payment source having a second priority to be usable for future payments from the payor and storing the priority rules in the at least one non-transitory computer memory;

communicating with the payor over a computer or telephone network to establish charge distribution rules for distributing a single payment across at least two of the prioritized plurality of payment source options according to the priority rules, wherein at least one of the charge distribution rules requires distributing the single payment across multiple payment source options even when the primary payment source has sufficient funds to satisfy a payment due;

identifying a payment due for a recurring bill from the payor;

submitting a transaction request for the payment due against the prioritized plurality of payment sources; and processing the transaction against the prioritized plurality of payment sources in the order of their priority, as set forth by the priority rules and the charge distribution rules stored in the payor waterfall database and accessible to the at least one computer processor, until one of said payment source options satisfies the payment due, wherein the transition from one payment source to another is automatically executed by the at least one computer processor in accordance with the priority rules and charge distribution rules, thereby providing a waterfall payment process enabling a single payment due from the payor for the recurring bills to be satisfied for the payee using a plurality of prioritized payment sources.

18. The system of claim 17, wherein the communication is accomplished by the payor using a mobile device over the network.

19. The system of claim 17, further comprising allowing the payor to establish payor payment rules.

20. The system of claim 19, wherein the payor payment rules include lock-in dates, the lock-in dates providing that payments should be submitted against a selected payment source on a predetermined date.

21. The system of claim 17, wherein the at least one computer processor further provides the payor with recommendations for using the multiple payment source accounts to minimize cost to the payor.

22. The system of claim 21, wherein the at least one computer processor further provides the payor with a recommendation of an amount of a credit card balance to pay to minimize cost to the payor.

23. The system of claim 17, wherein the plurality of payment source options is three, including the primary payment source, the secondary payment source, and a tertiary payment source.

24. The system of claim 17, wherein the plurality of payment source options is greater than three.

25. The system of claim 17, wherein the payor provides specific account information for each of the plurality of payment source options, and wherein the priority of said payment source options is set by the payee or by a payment administrator.

26. The system of claim 17, wherein the payor provides specific account information for each of the plurality of payment source options, and the payor selects the priority of said payment source options, thereby enabling the payor to set both the accounts to be used and the priority of usage of the accounts.

27. The system of claim 17, wherein submitting a transaction against the prioritized plurality of payment sources in the order of their priority includes submitting a first transaction for a portion of the balance due against a first payment source, and submitting a second transaction for a remaining portion of the balance due against a second payment source, thereby enabling distribution of the charge for the payment due across multiple payment sources in their order of priority.

28. The system of claim 19, wherein the payor payment rules provide (a) a lock-out date or window on which no transaction can be submitted against the at least one specified payment source, or (b) a minimum payment date or window on which a transaction exceeding a calculated amount that depletes funds in the at least one specified payment source beyond a predetermined balance is not to be submitted against the at least one specified payment.

29. The system of claim 19, wherein the payor payment rules provide that payment from at least one specified payment source should be attempted more than once before transitioning to the next priority payment source.

30. The system of claim 17, further comprising conducting at least one of a balance check and a limit check for a specified payment source prior to submitting a transaction for a transaction amount against the specific payment source, thereby enabling the avoidance of submitting transactions against payment sources unable to satisfy the transaction amount.

31. The system of claim 17, wherein identifying a payment due for the payee further comprises presenting information of the payment due to the payor prior to submitting a transaction.

32. The system of claim 31, further comprising receiving an approval from the payor prior to submitting a transaction.

33. A computer-implemented method of prioritized processing of payments for recurring bills, the payments from a payor to a payee, the method comprising:

storing, in at least one non-transitory computer memory, executable instructions for a server device or client computer and a plurality of payment source options, the payment source options being stored in a payor waterfall database and including multiple source accounts for payments of recurring bills;

accessing, using at least one computer processor, the at least one non-transitory computer memory and executing the instructions to perform multiple steps including:

facilitating creation of priority rules for prioritizing the payment source options for payment from the payor, wherein each of said multiple source accounts is selectable as a primary payment source having a first priority and a secondary payment source having a second priority to be usable for future payments from the payor and storing the priority rules in the at least one non-transitory computer memory;

communicating with the payor, the payor using a mobile device over a computer or telephone network to establish charge distribution rules for distributing a single payment across at least two of the prioritized plurality of payment source options according to the priority rules, wherein at least one of the charge distribution rules requires distributing the single payment across multiple payment source options even when the primary payment source has sufficient funds to satisfy a payment due;

identifying a payment due for a recurring bill from the payor by presenting information to the payor prior to submitting a transaction;

providing the payor with recommendations for using the multiple payment source accounts;

submitting the transaction request for the single payment due against the prioritized plurality of payment sources after receiving approval from the payor; and processing the transaction against the prioritized plurality of payment sources in the order of their priority, as set forth by the priority rules and the charge distribution rules stored in the payor waterfall database and accessible to the at least one computer processor, until one of said payment source options satisfies the single payment due, wherein the transition from one payment source to another is automatically executed by the at least one computer processor in accordance with the priority rules and charge distribution rules, thereby providing a waterfall payment process enabling a payment due from the payor for the recurring bills to be satisfied for the payee using a plurality of prioritized payment sources.

* * * * *